Aug. 28, 1962  J. FISCH ETAL  3,051,186
PRESSURE REGULATOR SYSTEM FOR HYDRAULIC TURBINES
Filed Oct. 30, 1958  3 Sheets-Sheet 1

INVENTORS
JACOB FISCH,
WEBSTER J. McCORMACK,
BY HARRY E. SMYSER.

ATTORNEY

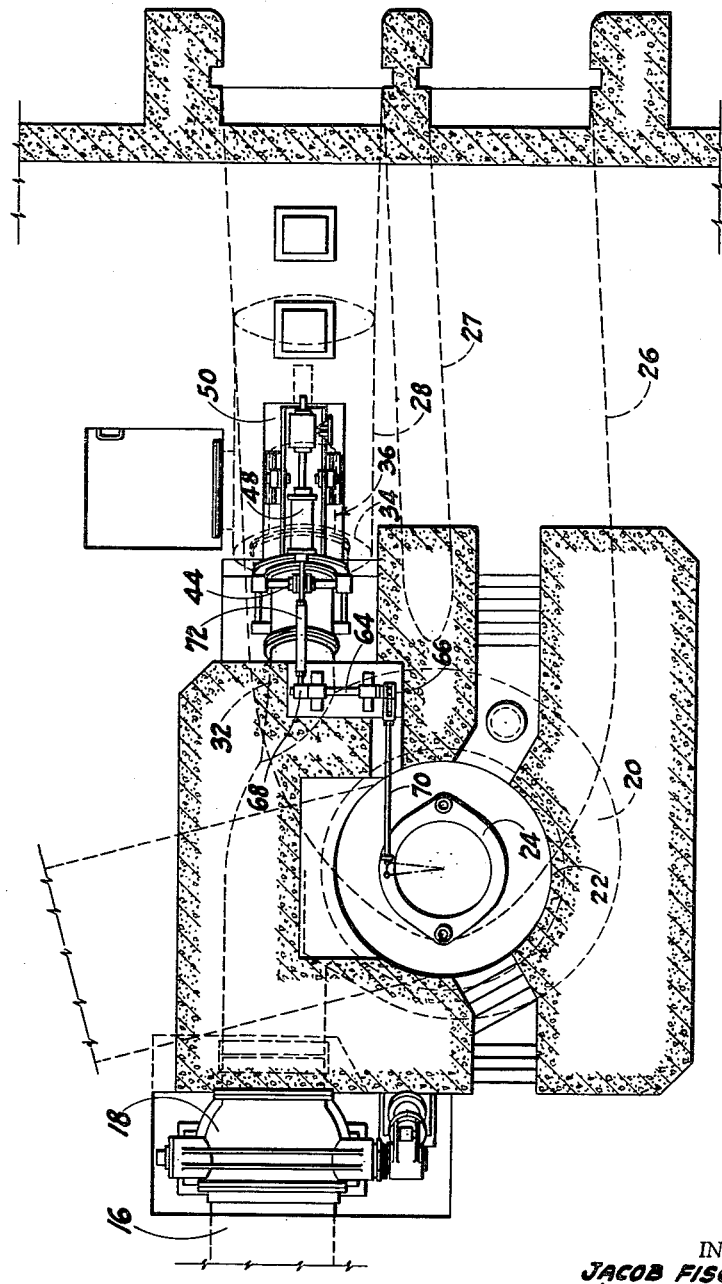

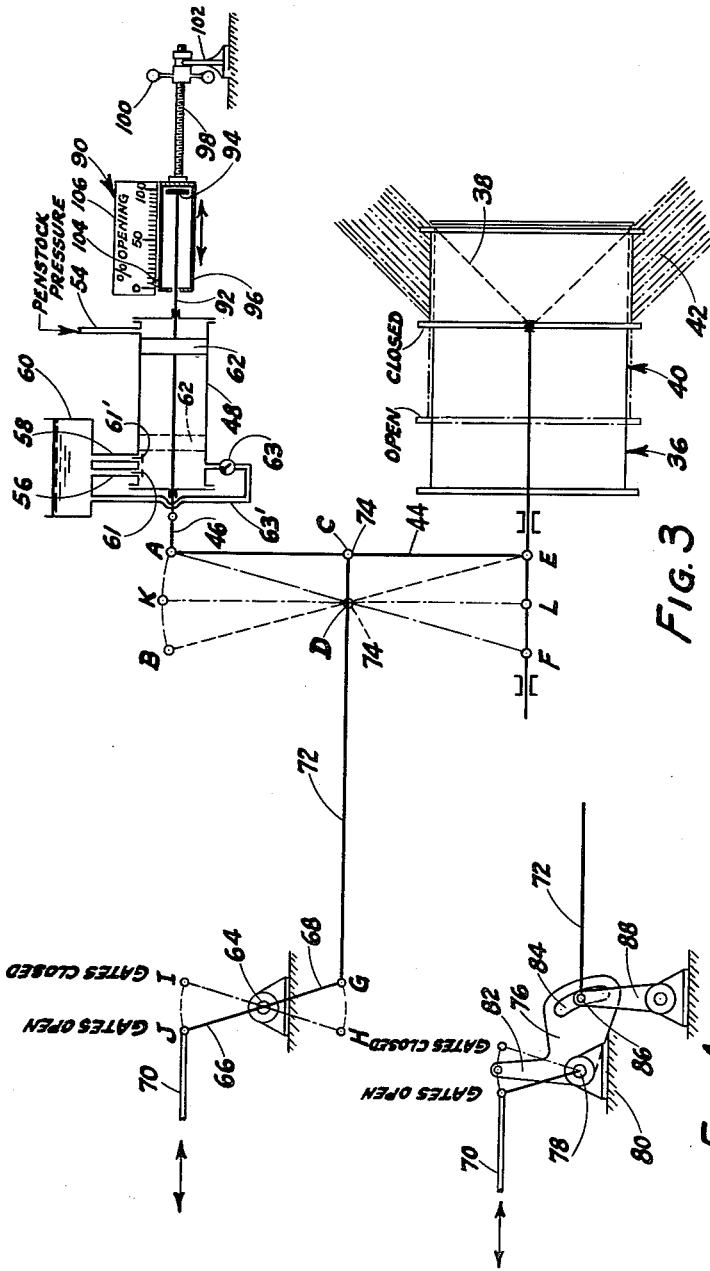

United States Patent Office 3,051,186
Patented Aug. 28, 1962

3,051,186
PRESSURE REGULATOR SYSTEM FOR
HYDRAULIC TURBINES
Jacob Fisch, Webster J. McCormack, and Harry E. Smyser, York, Pa., assignors, by mesne assignments, to Allis-Chalmers Manufacturing Company, Milwaukee, Wis., a corporation of Delaware
Filed Oct. 30, 1958, Ser. No. 770,641
7 Claims. (Cl. 137—25)

This invention relates to improvements in a pressure regulator system for a hydraulic turbine and, more particularly, for a turbine installation wherein it is desired to relieve the hydraulic pressure rise imposed upon the conduit and water distributor under conditions where the wicket gates to the turbine are closed suddenly, as well as installations wherein either the entire quantity of water or some portion thereof flowing to the installation must be discharged at all times.

One form of turbine installation commonly used is that wherein water from a suitable source, such as that impounded by a dam in a hydro-electric installation, is fed through a suitable conduit to a distributor comprising a spiral case surrounding an annular set of wicket gates, through which the water passes to the turbine runner. Under circumstances where the load upon the turbine suddenly is released and it is necessary to shut down the turbine, the wicket gates are closed suddenly, within a matter of a few seconds, whereby the moving stream of water from the supply conduit to the spiral case suddenly is stopped incident to such closing of the gates. This sudden stopping of the flow of large quantities of water, especially when the conduits are long, will impose increased hydraulic pressures upon the power house installation, resulting in abnormal vibration and excessive strains upon the water distributor and conduit system.

Under other circumstances where the hydraulic turbine is installed in a locality where water utilized for operating the turbine must be continuously available for use downstream from the turbine, regardless of fluctuating loads upon the turbine and therefore varying discharge through the turbine, it is necessary that means be provided which will by-pass some or all of the water around the turbine, especially when the load upon the turbine is not sufficient to require the full flow of the available water therethrough. Under these circumstances, a water by-passing arrangement must be provided which acts synchronously with the turbine wicket gates, whereby the area of the by-pass opening must be varied simultaneously with the gates opening variations so that the total water passage area remains substantially constant. However, when the turbine is to be operated up to its full capacity and the gates are fully opened, such full opening must correspond to the area required for passage of the available or desired quantity of water, and the total water by-pass area must also at all times be sufficient to pass the desired quantity of water.

Various means have been provided heretofore to by-pass water around a turbine to relieve pressure rise upon sudden closure of the wicket gates or to satisfy the conditions where all of the water available for operating the turbine must be continuously available for use down stream. Many of these devices however have been complicated and have included elaborate actuating and control means for by-pass valve structures, whereby the cost has been substantial and, in many instances, the operation of such control mechanism has been far from fool-proof.

The principal object of the present invention is to provide a pressure regulator and by-pass system for a hydraulic turbine system in which a preferably annular discharge type of valve is employed to by-pass water from the distributor, or spiral case, to the tail race, and the valve employs in the preferred embodiment a slidable sleeve as the movable valve member.

Another object of the invention is to provide a simple and rugged control mechanism for the valve member which, because of its simplicity, is fool-proof in operation.

Another object of the invention is to actuate the by-pass valve arrangement by operating mechanism directly connected to the gate ring by which the wicket gates in the distributor to the turbine are operated and, ancillary to this object, is a further object to include mechanism in the valve operating system which will function to provide direct stalling of the closing movement of the wicket gates in the event the valve should fail to function or otherwise is unable to open in synchronism with the closing of the wicket gates.

A still further object of the invention is to position the by-pass valve directly over the draft tube, thereby saving space in the power house as compared with the space required when using conventional pressure regulating systems, as well as eliminating the necessity of using extra regulator discharge tube gates.

Still another object of the invention is to minimize the number of operating parts over those required by conventional pressure regulator systems, while maintaining all of the advantages and universally of operation of the pressure regulator systems heretofore used which have embodied much more complicated structure in order to achieve the required control of the by-pass valve system so as to regulate the pressure upon the turbine.

Details of the foregoing objects and of the invention, as well as other objects thereof, are set forth in the following specification and illustrated in the accompanying drawings comprising a part thereof.

In the drawings:

FIG. 2 is a top plan view of the exemplary turbine installation illustrated in FIG. 1, certain parts of the supporting structure being horizontally sectioned to illustrate details to advantage.

FIG. 3 is a diagrammatic layout illustrating the essential elements of the pressure regulator system comprising the present invention, one position of the elements of said system being illustrated in full lines, while in broken lines, other positions of said elements are shown.

FIG. 4 is a schematic arrangement of a fragmentary part of the pressure regulator system shown in the preceding figures.

Figure 1:
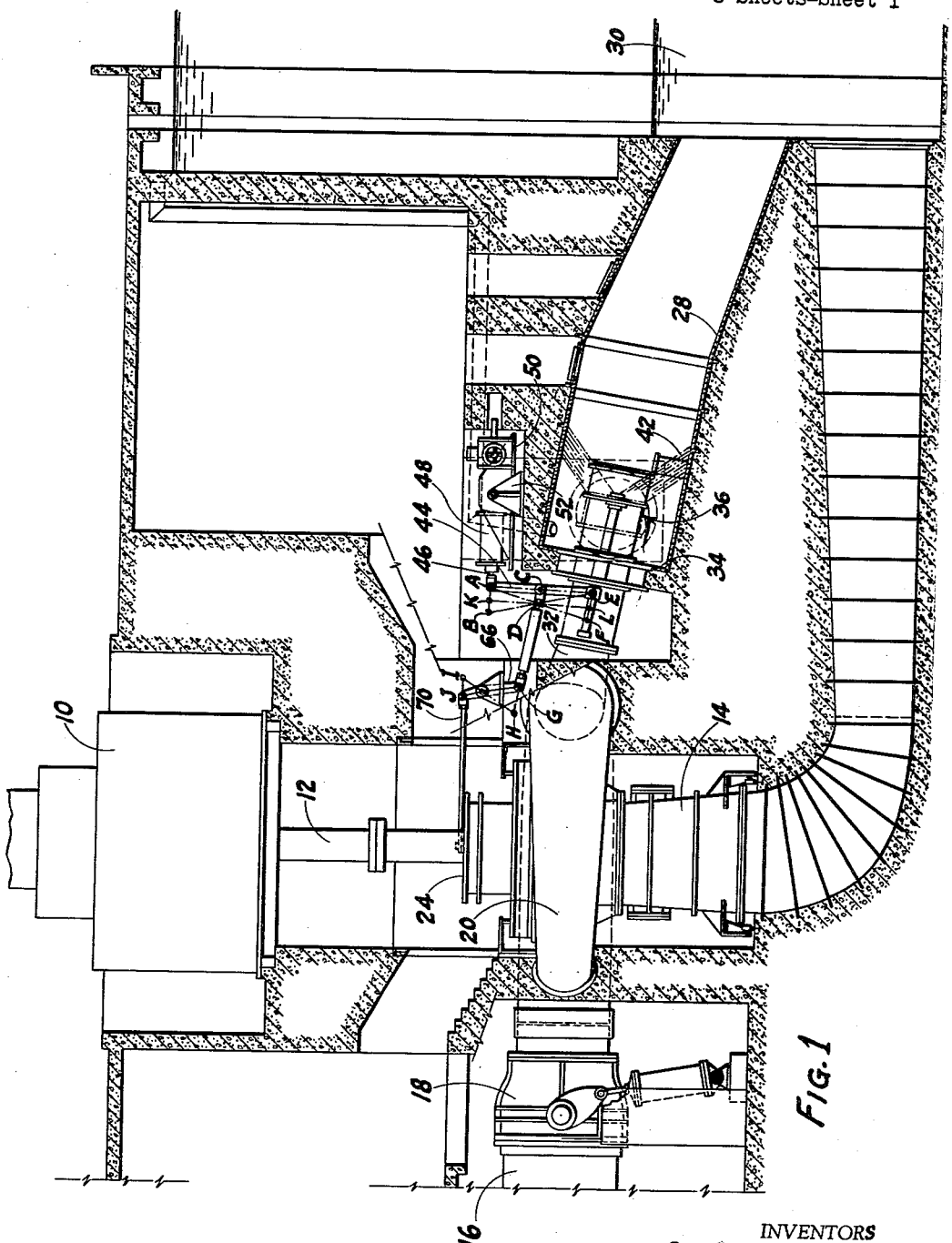
FIG. 1 is an exemplary vertical elevation of a typical turbine installation to which the present pressure regulator system is applied, certain parts of the supporting structure and discharge tube being vertically sectioned.

Referring to FIGS. 1 and 2, wherein an exemplary turbine installation is shown diagrammatically as it would appear in a typical power house of a hydro-electric plant, the generator 10 is driven by shaft 12, the lower end of which is connected to the turbine runner, not shown, but which is located within the distributor.

Water is supplied to the turbine by an inlet conduit 16 and passes through valve 18 to a spiral case distributor 20, said spiral case surrounding a set of annularly arranged wicket gates of well-known type, not shown, which operate upon axes parallel to that of the turbine shaft 12. The axes of the shafts of the wicket gates are disposed approximately around the circle 22 shown in FIG. 2 and the shafts of such gates have cranks on the upper ends thereof all commonly connected to a gate shifting ring 24. Said ring 24 is rotatable about the axis of the turbine in opposite rotary directions respectively to open and close said gates or to maintain them in any desired position between open and closed positions, the operation of the ring 24 being effected by suitable servomotors, not shown in accordance with well-known practice.

After the water passes between the wicket gates, when opened a predetermined amount to effect a desired speed of the turbine, the water engages the blades of the runner and is discharged through a draft tube 26 to the tail race downstream. In the illustration in FIG. 2, the draft tube 26 is shown having a conventional splitter blade 27.

In accordance with the principles of the present invention, a by-pass discharge conduit 28 is provided preferably directly over one of the draft tubes 26 and discharges into the tail water 30. An inlet tube 32 connects at its inlet end, tangentially, with the scroll case 20 as clearly shown in FIG. 2. The discharge conduit 28 preferably is larger in diameter than the inlet tube 32 and has a transverse end wall 34 thereon as shown in FIG. 1.

Connected between the inlet tube 32 and the end wall 34, and also extending through said end wall, is a by-pass valve 36 of the type diagrammatically illustrated in FIG. 3 and comprising a fixed cone 38 and a slidable valve sleeve 40. When the forward end of sleeve 40 engages the perimeter of cone 38, the valve will be closed and such closing movement will take place with a minimum of force due to the fact that the valve is of the type in which the hydraulic forces are substantially balanced.

The type of valve 36 specifically illustrated herein by way of example may be of a construction similar to that illustrated in U.S. Patents Nos. 1,894,314 and 1,950,848, but the invention is not necessarily restricted to the use of this type of valve. For a fuller understanding of the specific details of such valve, attention is directed to these prior patents. The slidable sleeve 40 of such valve is operated by any suitable mechanism such as a yoke lever 44, the opposite ends of the yoke being pivotally connected to slidably mounted bars or rods respectively connected to diametrically opposite sides of the slidable valve sleeve 40.

The upper end of the yoke lever 44 is connected to one end of a piston rod 46 which is longitudinally slidable relative to one end of a dash-pot 48 supported upon a bed member 50 having trunnions on opposite sides thereof respectively pivotally supported by standards 52 fixed relative to the by-pass discharge conduit 28. Hence, inasmuch as the lower end of the yoke lever 44 moves axially of the valve only, pivotal movement of the yoke lever 44 may take place readily due to the pivotal mounting of dash-pot 48 as described above.

One end of the dash-pot 48 is connected by a suitable conduit 54 to the penstock pressure, while the opposite end of the dash-pot cylinder is connected to a pair of spaced orifice tubes 56 and 58, extending downwardly from a reservoir 60 containing liquid, such as oil, suitable adjustable orifice valves 61 and 61' being mounted in the lower ends of orifice tubes 56 and 58. A liquid conduit 63' having a uni-directional check valve 63 therein also extends between reservoir 60 and the left-hand end of cylinder 48 as viewed in FIG. 3. Hence, when the piston 62 is moving toward the right in FIG. 3 as during opening movement of the wicket gates, fluid from reservoir 60 will flow readily and in sufficient volume through check valve 63 and into the left end of the cylinder 48 of the dash-pot. A minor amount of fluid also will flow into said cylinder from the orifice tubes 56 and 58 and orifice valves 61 and 61' because the latter, under normal conditions are always open. Actually, orifice valve 61' is always open but orifice valve 61 is of such nature that it may be closed but only under stalling conditions of the system when excessively high pressures occur within the dash-pot.

The orifice valves 61 and 61' primarily serve as a timing device to regulate the movement of piston 62 toward the left in FIG. 3 when the by-pass valve sleeve 40 is being closed gradually after the wicket gates have been closed, as will be described in greater detail hereinafter. Thus, during such closing movement of valve sleeve 40, the penstock pressure from conduit 54 is exerted against the right-hand end of the cylinder of dash-pot 48 to move piston 62 to the left-hand end of the cylinder against the fluid pressure therein. Check valve 63 will be closed at such time and the small escape of fluid permitted by orifice valves 61 and 61' to the reservoir 60 will insure gradual closing of valve sleeve 40.

Although the construction illustrated in FIGS. 1 through 3 shows a rotatable shaft 64 mounted in fixed bearings and a pair of crank levers 66 and 68 which respectively are fixed to opposite ends of shaft 64, for purposes of the diagrammatic illustration in FIG. 3, the crank levers 66 and 68 may be considered a single lever pivoted intermediately of the ends thereof to shaft 64. An operating rod 70 is connected at one end to the upper end of crank lever 66 and the other end thereof is interconnected directly to the gate shifting ring 24 so as to be directly actuated thereby. The end of crank lever 68 is pivotally connected to one end of control rod 72, and the opposite end of control rod 72 is pivotally connected to yoke lever 44 intermediately of the ends thereof. The latter pivotal connection 74, see FIG. 3, is movable or floats for purposes to be described; that is, it is not a pivot which is fixedly located except longitudinally of yoke lever 44.

Description of Operation

In describing the operation of the simplified control mechanism described hereinabove, reference is made primarily to FIG. 3, wherein the operation of the various elements is illustrated diagrammatically so as to afford a quick and clear understanding of the invention. It will be assumed for purposes of the description that the principal object of the invention is to relieve shock to the hydraulic conduit 16 and the spiral case distributor 20, for example, as when: the turbine is operating under full load, the wicket gates are open, the by-pass valve 36 is closed and the turbine load is released so as to require the rapid closing of the wicket gates, as controlled by a conventional governor, not shown, within a few seconds.

According to the principles of the invention, the by-pass valve 36 opens simultaneously with, and in direct proportion to the closing of the wicket gates. The operating rod 70, under such circumstances, moves to the right as viewed in FIG. 3, shifting the pivot with lever 66 from position J to position I. This causes the pivotal connection of lever 68 with control rod 72 to shift from position G to position H. Rod 72 causes pivotal connection 74 to move from position C to position D, the pivot at position A remaining momentarily stationary, whereby the lower end of yoke lever 44 moves from position E to position F, thereby opening the sliding sleeve 40 of the by-pass valve 36. The momentary position of pivot A is maintained by virtue of the fact that the stroking speed of the dash-pot is many times slower than the stroking of operating rod 70 as caused by the conventional governor of the turbine installation.

Under normal conditions, when the wicket gates are moved to fully closed position within a short time, such as a few seconds, by-pass valve 36 correspondingly is moved to fully open position within the same time, thereby freely discharging all of the operating water for the turbine through the valve opening and into the by-pass discharge conduit 28, through which the discharging water is transmitted to the tail race 30 at the exit of the draft tubes 26.

In order that a minimum amount of operating water will be by-passed to the tail race under the circumstances described above, particularly under conditions where the operating water is from an impounded source and conservation of water is desired since there is no need to continuously by-pass excess water as under conditions described hereinafter, it is desirable to follow the rapid opening of the valve by a gradual closing of the by-pass valve 36, such as within a matter of a few minutes, and at a speed which will not place an undue strain upon the water conduit 16 and spiral case distributor 20. Hence, the orifice valves 61 and 61' in the lower ends of orifice tubes 56 and 58 are of the type and are regulated to gradually permit the fluid within the left-hand end of dash-pot cylinder 48 to be discharged upwardly into the reservoir 60 within the desired time as a result of the penstock pressure entering the right-hand end of the cylinder 48 through the conduit 54. Such penstock pressure is substantial and is readily capable of causing such movement of the dash-pot piston 62 to the left as seen in FIG. 3.

At the commencement of movement of the piston 62 to the left as described above, the pivotal connection 74 is at position D and this position remains fixed due to the closed positions of the wicket gates. Accordingly, the upper pivotal connection of yoke lever 44 moves from position A to position B, whereas the lower pivotal connection of lever 44 moves from position F to position E and closes the by-pass valve. The wicket gates and by-pass valve then remain closed as long as the turbine is shut down.

When the turbine is to be restored to service, the wicket gates open slowly, at a rate determined by the governor timing in accordance with established practice. Under such circumstances, the right-hand end of operating rod 70 moves from position I to position J, the left-hand end of control rod 72 moves from position H to position G and inasmuch as the by-pass valve 36 is closed, the pivotal connection 74 will move from position D to position C, thereby restoring the outer end of the dash-pot piston rod from position B to position A, against the penstock pressure and fluid from reservoir 60 is drawn into the left-hand end of dash-pot cylinder 48, principally through check valve 63. The turbine then will operate at desired capacity. Under such circumstances, the governor must overcome the hydro-dynamic unbalance on the wicket gates in moving toward open position, as well as the dash-pot force against the penstock pressure, and normal friction.

It also is possible to arrange the device so that the wicket gates may be closed manually, for example at a rate equal to or slower than the dash-pot timing. Under such circumstances, the by-pass valve 36 remains closed and the upper end of yoke lever 44 will move from position A to position B.

Under circumstances where by-pass valve 36 may not operate as rapidly as desired or entirely resists opening movement and remains closed, and particularly when it is desired to close the wicket gates rapidly, the mechanism described above provides safety to the water distribution system in that the lower end of yoke lever 44 will remain at position E under these conditions. Also, the dash-pot unit must resist the force of the governor plus the unbalance of the wicket gates intending to be moved to closed position, plus the penstock pressure force of conduit 54. Equivalent pressure is provided in the throttle side of the dash-pot unit, which is the left-hand end as viewed in FIG. 3, and this pressure is several times the normal pressure at which the orifice valve 61 in orifice tube 56 is set to close, whereby said valve is closed. Accordingly, relief from the situation takes place through the orifice valve 61' in orifice tube 58 which is suitably adjusted for a safe rate of closure under such maximum pressure. The gradually escaping fluid through orifice tube 58 to the reservoir 60 will cause the wicket gates to close slowly and thereby prevent undue hydraulic strain upon the water distributing means including spiral case distributor 20.

When it is desired that the sum of the discharges through the turbine and the by-pass valve be substantially even throughout the full movement of the mechanism, then the apparatus shown in FIG. 4 is employed. Normally the characteristic of the discharge through the turbine and by-pass valve is non-linear or non-straight line. Hence, in any movement of the linkage diagrammatically shown in FIG. 3, the summation of the discharge characteristics will not be constant. Thus, when it is desired or necessary that such summation be substantially constant, the mechanism of FIG. 4 is installed between rods 70 and 72.

By using this mechanism, the motion between operation rod 70 and control rod 72, rather than being directly proportional, will effect a change in ratio of the radius by which the motion of rod 70 is imparted to rod 72 through the medium of pivoted bell crank 76 mounted on pivot 78 carried by a suitable stationary support 80. Bell crank 76 has a leg 82 connected to one end of operating rod 70 and a cam slot 84 within which a roller 86 operates. The cam roller 86 is pivotally connected to the upper end of pivoted lever 88, carried by a stationary support, and one end of control rod 72. Hence lever 86 will control the movement of rod 72 by cam slot 84. The location and position of the cam slot 84 within bell crank 76 and its position relative to pivot 78 will be determined suitably from all of the linkage components connected to yoke lever 44 and relative movements thereof. However, the mechanism of FIG. 4 will produce constant discharge characteristics when the correct curvature and position of cam slot 84 is determined for any given dimensions of yoke lever 44 and members connected thereto.

*Synchronous By-Pass Operation*

The present invention also includes mechanism by which synchronous by-passing of some of the water may take place through by-pass valve 36 while the rest of the water is used to drive a turbine. This is accomplished by providing adjustable means 90 for controlling movement of the dash-pot piston, whereby the by-pass valve 36 will be held at an opening corresponding to the desirable minimum discharge even while the wicket gates are closed. The adjustable means may be any of a number of suitable types, of which one exemplary and somewhat diagrammatic type is shown in FIG. 3 adjacent dash-pot 48. This comprises a rod 92 connected to and extending to the right from piston 62. Stop abutment 94 is connected to the outer end thereof and operates within a longitudinally adjustable stop member 96, the opposite ends of which may be abutted by abutment 94. Threaded extension 98 on stop member 96 passes through a threaded hand wheel 100 maintained against longitudinal movement by a fixed yoke 102. Stop member 96 may have a pointer 104 thereon readable relative to a suitable fixed scale 106 which has indicia thereon corresponding to percentage of by-pass desired.

For by-pass of water through valve 36 while the wicket gates are closed, the stop member 96 is moved by hand wheel 100 to afford the desired discharge, thereby disposing the upper end to yoke lever 44 at position K, for example, under which conditions the pivotal connection 74 will be at position D and the lower end of yoke lever 44 will be at position L, whereby the by-pass valve 36 will be approximately half-open for example. If the turbine discharges more than the desired minimum discharge however, then the whole system operates as described under the preceding heading except that when the wicket gates are fully closed, the by-pass valve 36 will close only to the position corresponding to the preset minimum discharge position of stop member 96.

The by-pass mechanism described above may be operated manually or by suitable power means such as a motor, not shown, the latter being controlled either locally or remotely. However, the capacity must be sufficient to overcome the dash-pot penstock pressure force, plus the force of operating the by-pass valve 36, plus the friction when the valve is free to move.

If the by-pass valve 36 stalls in an intermediate by-pass position, then the governor also will stall at a corresponding position. To permit the governor to close the gates under such circumstances, the by-pass stop must be retracted to let the pivotal connection at the upper end of yoke lever 44 to move from position K to position B. This is an emergency condition and the by-pass operating mechanism must release against a force consisting of the governor force, and the gate unbalance, minus friction and the penstock pressure force. This force is maximum when the gates are near open position.

From the foregoing, it will be seen that the present invention provides a pressure regulator system for hydraulic turbines which may be operated to rapidly by-pass operating water to the tail race immediately upon closing the wicket gates, as when the turbine is to be shut down, thereby minimizing strain and shock upon the water conducting system and particularly the spiral case distributor supplying water through wicket gates to the turbine runner. Automatically and immediately after such rapid opening, the by-pass valve is closed gradually so as to conserve water power but such closing is at a rate which will prevent shock to the water distributing system. However, under conditions where a certain minimum amount of water is to be continuously by-passed down stream, whether the turbine is shut down or operating, means are provided by which the by-pass valve correspondingly is regulated to permit the synchronous discharge of an adequate amount of water to satisfy the downstream requirements.

While the invention has been described and illustrated in its several preferred embodiments, and has included certain details, it should be understood that the invention is not to be limited to the precise details herein illustrated and described since the same may be carried out in other ways falling within the scope of the invention as claimed.

We claim:

1. A pressure regulator system for a hydraulic turbine comprising a distributor surrounding said turbine and having means to communicate with a head of water from a penstock, and gate means actuated by gate ring connected thereto and operable to control the flow of water from said distributor to said turbine, in combination wit ha by-pass valve communicating with said distributor and having a movable valve member, a dash-pot having a cylinder connected at one end to penstock pressure and a piston movable therein, fluid source means connected to the other end of said cylinder, restricted fluid outlet means connected between said fluid source means and said other end of said cylinder, a floating lever connected at opposite ends respectively to said dash-pot piston and movable valve member, an actuating lever connected between said floating lever and gate ring, whereby when said gate means are closed to stop said turbine said gate ring will move said actuating lever and floating lever in a direction to move said valve member to open position while said dash-pot piston remains substantially stationary and thereafter the penstock pressure will act upon the piston of said dash-pot to move it in a direction to move said floating lever in a direction to move said valve member toward closed position at a rate slower than the opening movement while said actuating lever is maintained stationary by said closed gate means, and adjustable stop means interconnected to said dash-pot piston and operable to limit the movement thereof by penstock pressure in said direction to move said valve member to closed position, whereby said by-pass valve may remain open a desired predetermined amount at all times to permit a predetermined amount of water to be by-passed from said penstock when said gate means are open and closed.

2. A pressure regulator system for a hydraulic turbine comprising a distributor surrounding said turbine and having means to communicate with a head of water from a penstock, and gate means actuated by a gate ring connected thereto and operable to control the flow of water from said distributor to said turbine, in combination with a by-pass valve communicating with said distributor and having a movable valve member, a dash-pot comprising a piston movable within a cylinder, means at one end of said cylinder communicating with said penstock, whereby said piston is responsive to water under pressure from said penstock for movement in one direction, a floating lever interconnected at its opposite ends respectively to said movable valve member and the piston of said dash-pot, and an actuating lever connected for direct actuation between said floating lever and gate ring, said actuating lever being connected to said floating lever intermediately of the ends thereof, said arrangement of levers being such that said movable valve member is moved to open position directly by said gate ring and subsequently to closed position by penstock pressure operating upon the piston of said dash-pot.

3. A pressure regulator system for a hydraulic turbine comprising a distributor surrounding said turbine and having means to communicate with a head of water from a penstock, and gate means actuated by a gate ring connected thereto and operable to control the flow of water from said distributor to said turbine, in combination with a by-pass valve communicating with said distributor and having an annular discharge opening and a reciprocable valve member operable to open and close said opening, a dash pot comprising a piston movable within a cylinder, means at one end of said cylinder communicating with a reservoir for fluid and the other end of said cylinder being connected to a source of pressure, a floating lever interconnected at its opposite ends respectively to said movable valve member and the piston of said dash-pot, and an actuating lever connected for direct actuation between said floating lever and gate ring, said actuating lever being connected to said floating lever intermediately of the ends thereof, said arrangements of lever being such that said movable valve member is moved to open position directly by said gate ring and subsequently to closed position by the piston of said dash-pot, said fluid reservoir in communication with said dash-pot cylinder insuring the supply of liquid in one end of said cylinder.

4. A pressure regulator system for a hydraulic turbine comprising a distributor surrounding said turbine and having means to communicate with a head of water from a penstock, and gate means actuated by a gate ring connected thereto and operable to control the flow of water from said distributor to said turbine, in combination with a by-pass valve communicating with said distributor and having a movable valve member, linkage means directly interconnecting said movable valve member to said gate ring for opening of said valve member directly by said gate ring while said gate ring is moving said gate means to closed position, means interconnected to said valve member and operable independently of said gate ring after opening of said valve to move said valve member to closed position at a slower rate than that of the opening movement thereof, and means selectively operable to prevent movement of said valve member to fully closed position whereby partial by-passing of water through said valve may take place when said gate means are closed.

5. A pressure regulator system for a hydraulic turbine comprising a distributor surrounding said turbine and having means to communicate with a head of water from a penstock, and gate means actuated by a gate ring connected thereto and operable to control the flow of water from said distributor to said turbine, in combination with a by-pass valve communicating with said distributor and having a movable valve member, a dash-pot having a cylinder and means to connect one end of said cylinder to said penstock and having a piston movable therein, fluid source means connected to the other end of said cylinder, restricted fluid outlet means connected between said fluid source means and said other end of said cylinder, a floating lever connected at opposite ends respectively to said dash-pot piston and movable valve member, and actuating lever means connected between said floating lever and said gate ring, whereby when said gate means are closed to stop said turbine said gate ring will move said actuating lever means and floating lever in a direction to move said valve member to open position while said dash-pot remains substantially stationary and thereafter water under pressure from said penstock will move the piston of said dash-pot in a direction to move said floating lever in a direction to move said valve member to closed position at a rate slower than the opening movement while said actuating lever means is maintained stationary by said closed gate means.

6. The pressure regulator system set forth in claim 5 further characterized by said actuating lever means comprising a pair of levers and a pivoted bell crank having a cam slot therein, one of said levers being connected to one end of said bell crank and the other lever having one end operable by said cam slot, the cam slot being shaped and positioned within said bell crank to effect variable movement of said floating lever relative to said gate ring in a manner to produce a substantially even summation of discharge volumes through said by-pass valve and turbine during all movements of the pressure regulator system.

7. The pressure regulating system set forth in claim 5 further including means interconnected to said dash-pot and operable to limit the movement of the piston thereof by penstock pressure in said direction to move said valve member to closed position, whereby said by-pass valve will remain open a predetermined amount at all times to permit a predetermined amount of water to be by-passed from said penstock when said gate means are open and closed.

References Cited in the file of this patent

UNITED STATES PATENTS

| | | |
|---|---|---|
| 806,154 | Lombard | Dec. 5, 1905 |
| 1,202,310 | Pfau | Oct. 24, 1916 |
| 1,706,813 | Pfau | Mar. 26, 1929 |
| 1,894,314 | Howell | Jan. 17, 1933 |
| 1,950,848 | Howell | Mar. 13, 1934 |
| 2,059,649 | Pfau | Nov. 3, 1936 |
| 2,681,660 | Avery | June 22, 1954 |